United States Patent [19]
Tomlin et al.

[11] 3,776,507
[45] Dec. 4, 1973

[54] MEANS TO ROTATE SPHERICAL PLUG VALVE

[75] Inventors: Jerry B. Tomlin, Houston; John Helenberg, La Porte, both of Tex.

[73] Assignee: ACF Industries, Incorporated, New York, N.Y.

[22] Filed: Dec. 15, 1971

[21] Appl. No.: 208,249

[52] U.S. Cl. .............................. 251/248, 137/315
[51] Int. Cl. ............................................. F16k 31/53
[58] Field of Search.............. 251/248, 249.5, 250.5, 251/269; 137/315

[56] References Cited
UNITED STATES PATENTS

| | | | |
|---|---|---|---|
| 2,917,273 | 12/1959 | Best | 251/269 X |
| 777,372 | 12/1904 | Howard | 251/248 X |
| 783,007 | 2/1905 | Allen et al. | 251/248 X |
| 2,064,765 | 12/1936 | Powell et al. | 251/250.5 X |
| 3,064,938 | 11/1962 | Knox | 251/249.5 X |
| 3,194,534 | 7/1965 | Sachnik | 251/287 X |

FOREIGN PATENTS OR APPLICATIONS

| | | | |
|---|---|---|---|
| 587,497 | 11/1959 | Canada | 251/249.5 |

*Primary Examiner*—Edgar W. Geoghegan
*Attorney*—Eugene N. Riddle

[57] ABSTRACT

A spherical plug valve structure includes a valve ball mounted on opposed trunnions and having an offset gear drive for rotation of the valve ball. The offset gear drive is mounted internally of the valve body and includes a segment gear mounted on the outer surface of the valve ball in offset relation to the axis of rotation. A pinion engages the segment gear and has a drive shaft extending through the valve body to a suitable external power drive source. The pinion and drive shaft are detachably connected to the valve body and may be easily removed. The trunnions on which the valve ball is mounted for rotation may also be easily removed.

5 Claims, 4 Drawing Figures

MEANS TO ROTATE SPHERICAL PLUG VALVE

BACKGROUND OF THE INVENTION

Heretofore, various types of valves have been provided with internal drive mechanisms for rotating a valve member. Such prior drive arrangements have generally been provided with direct drives connected to a shaft in alignment with the axis of rotation of the valve member. A direct drive is usually limited in obtaining a large mechanical advantage and as a result, a relatively large operator is necessary for rotation of the valve member. Further, direct drive gear mechanisms that are mounted within the valve body cavity require a relatively large amount of space in which to be mounted and usually require a specially made valve body for housing the gear mechanism.

BRIEF DESCRIPTION OF THE INVENTION

The present ball valve structure is directed to an offset drive means for the valve ball with the drive means being connected to the exterior of the valve ball for rotating the valve ball about opposed trunnions. The offset drive means is housed within the normal valve body cavity between the valve body and valve ball without any enlarged valve body for the drive means. A relatively high mechanical advantage is obtained by the offset drive means and this permits a relatively small external operator or power source for rotating the valve ball. For example, the torque requirements for rotating the valve ball may be reduced between around 300 and 500 percent depending on the particular mechanical advantage desired. The ball valve structure of the present invention is particularly adapted for relatively large diameter valves having a flow passage greater than around 12 inches in diameter.

The offset drive means includes a sector gear mounted on the exterior of the valve ball and a pinion within the valve body cavity engaging the sector gear. A housing is detachably connected to the valve body and extends through an opening in the valve body. The housing receives the pinion shaft and is of a diameter greater than the pinion to permit withdrawal of the pinion upon removal of the housing from the valve body such as might be required for repair or the like. The housing also includes a support base on which a power source, such as an electrical motor, is mounted for driving the pinion and the associated valve ball.

The valve ball is a cast structure and is symmetrical which permits a desirable casting operation. The trunnions on which the valve ball is mounted are detachably connected to the valve body to permit easy removal thereof and opposed bores in the valve ball receive the trunnions. A suitable stop is provided on the valve body to engage and position the valve ball in the open and closed positions thereof.

The invention accordingly comprises the constructions hereinafter described, the scope of the invention being indicated in the following claims.

In the accompanying drawings, in which one of various possible embodiments of the invention is illustrated, FIG. 1 is a top plan of the ball valve structure comprising the present invention showing the valve ball in an open position;

Figure 2:
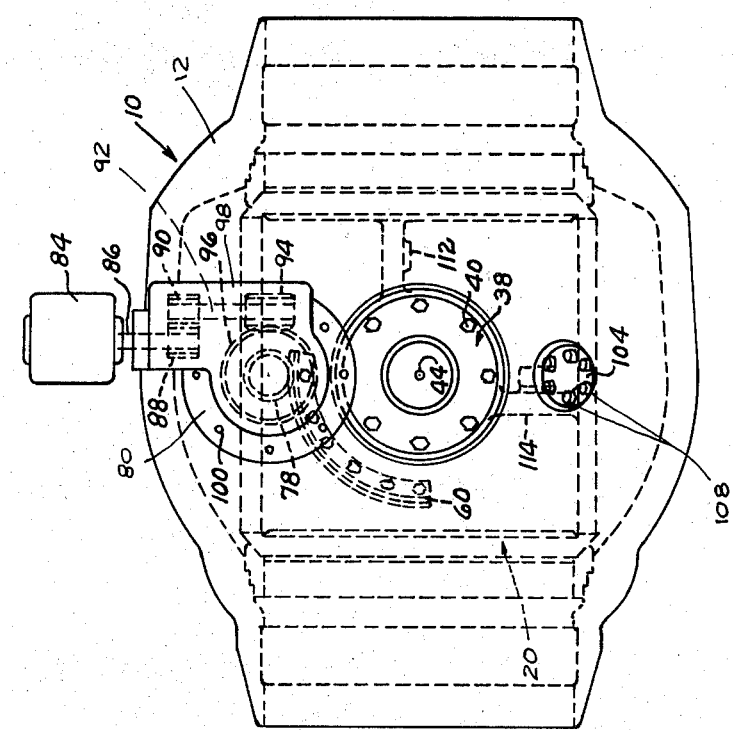
FIG. 2 is a top plan similar to FIG. 1 but indicating the valve ball rotated 90° to the closed position.

Referring now to the drawings for a better understanding of this invention, a ball valve structure indicated generally at 10 has a valve body 12 defining the valve chamber or body cavity 14. Valve body 12 has an upstream flow passage 16 and a downstream flow passage 18. Flow passages 16 and 18 are aligned and are connected to a suitable fluid conduit (not shown). The outer end portions of valve body 12 may be provided with external screw threads to provide a connection for valve structure 10 in a flow system, as well known in the art.

Positioned in body cavity 14 is a rotatable valve ball 20 having spherical annular seating surfaces 22 and 24 and a flow passage 25 in alignment with flow passages 16 and 18 in the open position of valve ball 20. Mounted adjacent opposed ends of valve ball 20 are upstream sealing member 26 and downstream sealing member 28 which are annular and adapted to fit against respective seats 22 and 24 of valve ball 20. Sealing members 26 and 28 may be pressure actuated, that is, the sealing members are mounted for limited longitudinal movement relative to valve ball 20 and may be urged by fluid pressure against seats 22 and 24 to provide a tight seal between valve ball 20 and sealing members 26 and 28. Sealing members 26 and 28 have a plastic insert 30 which extends beyond the adjacent face of the associated sealing member and forms a sealing surface for contact with the adjacent seating surface 22 or 24 on valve ball 20. A suitable insert may be polytetrafluoroethylene, sold under the trademark "Teflon" which provides a very desirable insert since it has an exceedingly low coefficient of friction and is inert to most ladings.

Valve ball 20, before addition of the drive means, is symmetrical and has external ribs 31 thereon. Opposed lower and upper bores 32 and 34 in opposed ends of valve ball 20 receive respective lower and upper trunnions 36 and 38. Lower and upper trunnions 36, 38 are generally identical and are removably attached by suitable studs 40 to valve body 12. Lubricant bores 42 extend through trunnions 36 and 38 to valve ball 34 and suitable fittings 44 are in communication with bores 42. Roller bearings 48 and 50 are mounted between trunnions 36, 38 and valve ball 20 to reduce friction therebetween upon rotation of valve ball 20.

Figure 3:
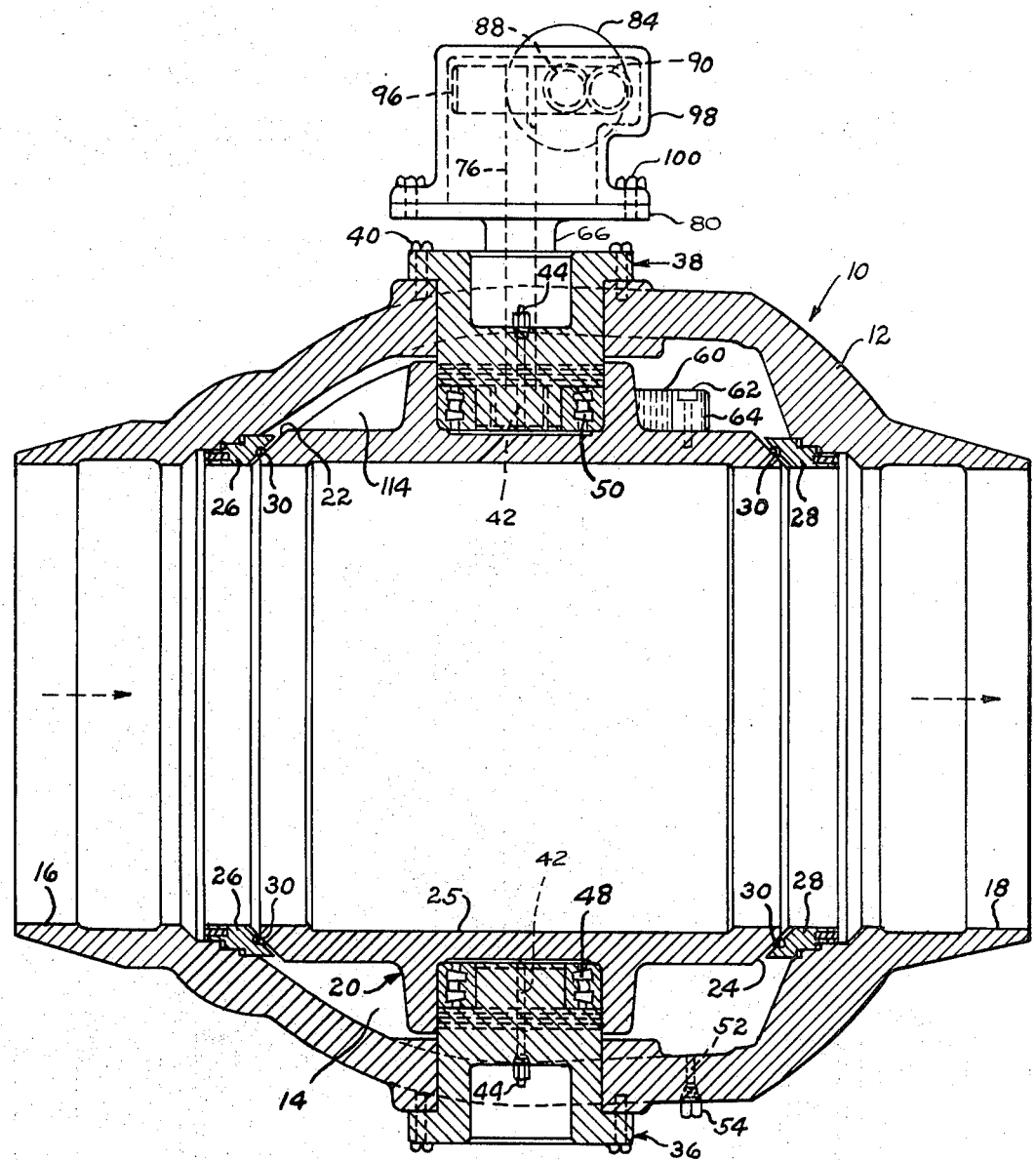
FIG. 3 is a section taken generally along line 3—3 of FIG. 1.
Figure 4:
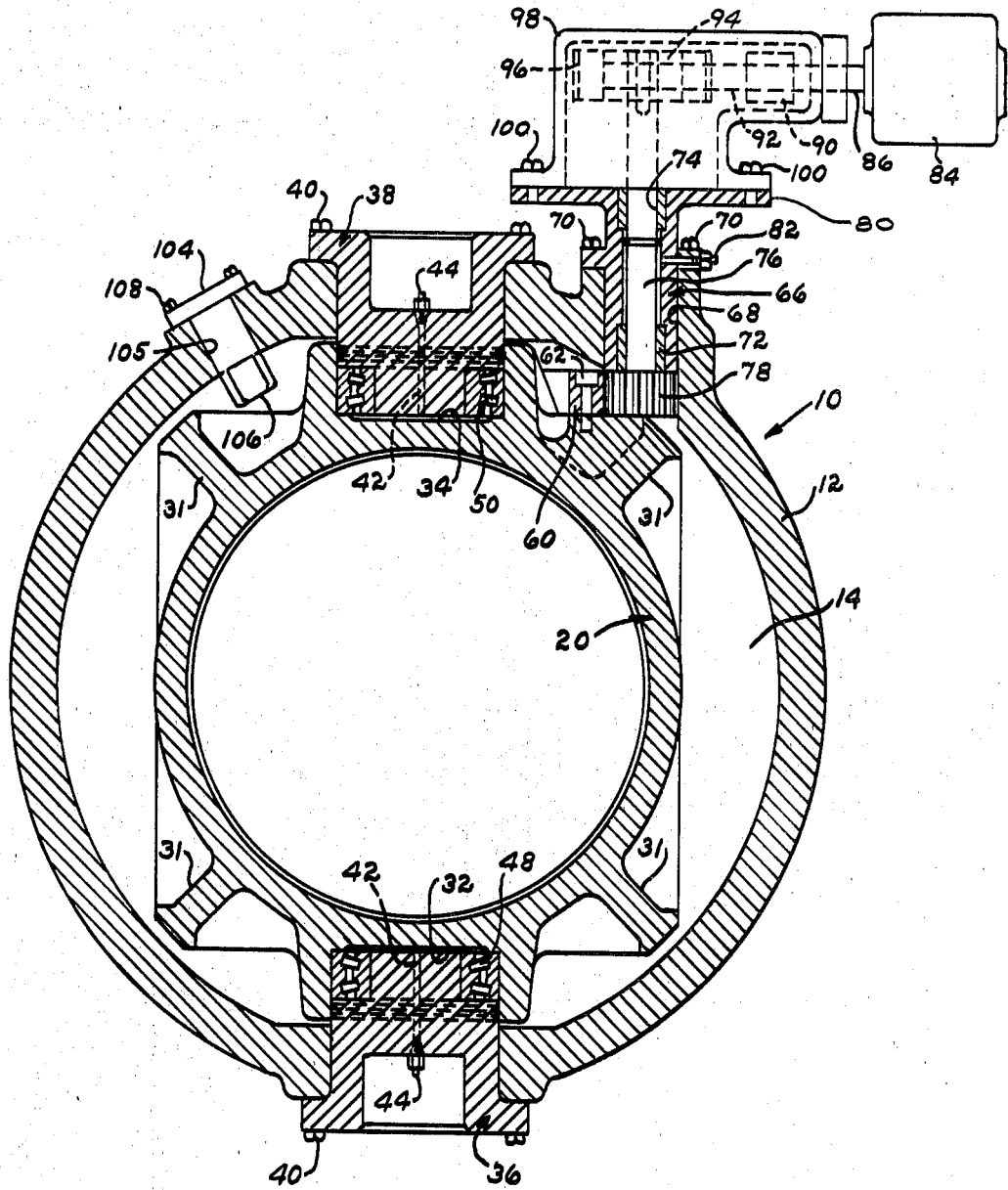
FIG. 4 is a section taken generally along line 4—4 of FIG. 1 showing a pinion in engagement with the sector gear on the valve ball.

As shown in FIG. 3, a drain bore 52 may be provided in valve body 12 to permit the removal of fluids from valve cavity 14. A drain plug 54 for drain bore 52 may be removed for drainage of any fluid from body cavity 14.

Mounted on the outer portion of valve ball 20 offset from adjacent trunnion 38 is a segment gear generally indicated 60 secured by suitable studs 62 and having teeth 64 along an outer edge thereof. A housing 66 is received within opening 68 in valve body 12 and is detachably connected by studs 70 to valve body 12. Mounted for rotation in bearing sleeves 72, 74 within housing 66 is pinion shaft 76 having pinion 78 at its lower end in engagement with sector gear 60. The upper portion of housing 66 has a support base 80 thereon.

The diameter of pinion 78 is less than the diameter of opening 68 and housing 66. Thus, upon removal of studs 70 from valve body 12, housing 66 with pinion shaft 76 and pinion 78 may be bodily removed from valve body 12 thereby permitting repair of pinion 78. A lubricant fitting 82 is provided to permit lubrication of rotating pinion shaft 76. An electric motor 84 provides a suitable power source and may be connected to a suitable source of electrical energy (not shown). An output drive shaft 86 from motor 84 has a spur gear 88 thereon in mesh with spur gear 90 on countershaft 92. A worm gear 94 on the end of countershaft 92 is in engagement with worm wheel 96 secured to the upper end of pinion shaft 76. Gear housing 98 is removably secured by studs 100 to support base 80.

Figure 1:
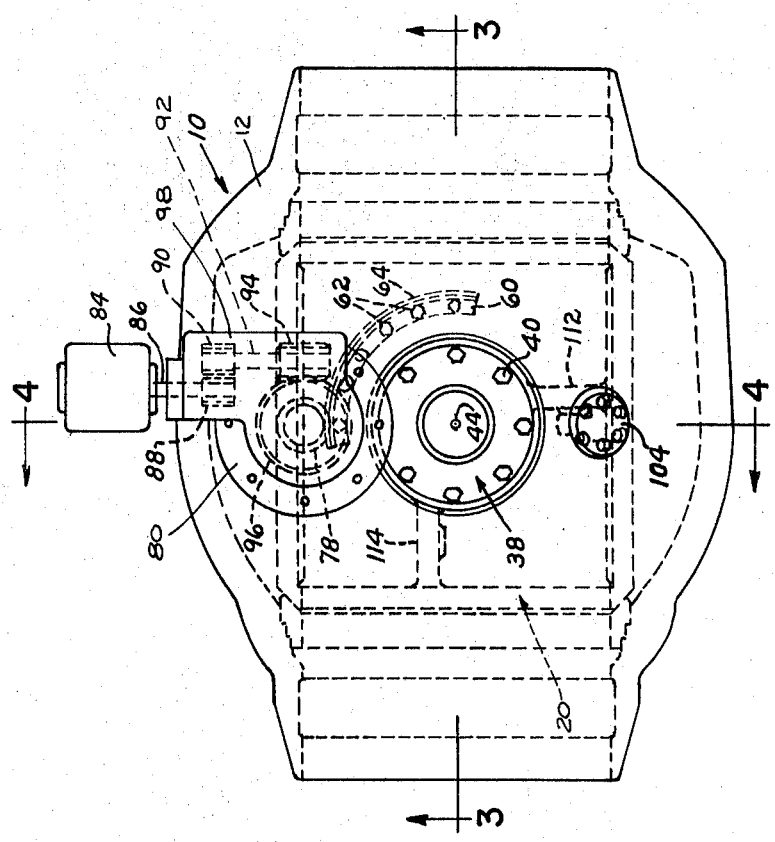

A stop indicated generally at 104 extends through an opening 105 in valve body 12 and has a lower portion 106 within valve cavity 14. Studs 108 secure stop 104 to valve body 12. As shown in FIG. 1, rib 112 on valve ball 20 engages stop portion 106 in the open position of valve ball 20. Upon rotation of valve ball 20 to the closed position shown in FIG. 2, rib 114 engages stop 104. Thus, valve ball 20 may be accurately positioned in both the open and closed positions of the ball valve structure 12.

The gear ratios may be suitably designed to provide the desired mechanical advantage. However, particularly with large diameter valves over 24 inches a mechanical advantage of around five to one or more is desirable. As valve ball 20 rotates only ninety degrees, the pinion 78 would rotate about 450°.

Valve ball 20 may move longitudinally in the direction of flow relative to valve body 12 as much as around .050 inch from tolerances and the like. To minimize the effect of such movement of valve ball 20 on the tolerance between sector gear 60 and pinion 78, pinion 78 is positioned along the transverse axis of valve body 12. Thus, the spacing of sector gear 60 from the rotational axis of pinion 78 remains substantially constant upon any longitudinal movement of valve ball 20.

What is claimed is:

1. A ball valve structure comprising a valve body having a valve chamber therein and upstream and downstream flow passages in communication with the valve chamber, a valve ball mounted within the valve chamber and forming a body cavity between the valve ball and the valve body, trunnions on opposed ends of the valve ball on which the valve ball is mounted for rotation, a gear segment within the body cavity mounted on the outer surface of the valve ball adjacent one of the trunnions in laterally spaced relation thereto, said valve body having an opening therethrough adjacent said gear segment and spaced from said adjacent trunnion in a direction extending transversely of the longitudinal axis of the flow passages, a housing fitting within the opening and detachably secured to the valve body, a shaft mounted within said opening for rotation and having a pinion on its inner end positioned within the body cavity and in engagement with the gear segment, the outer diameter of the pinion being less than the outer diameter of the housing whereby upon detachment of the housing the pinion and shaft may be axially removed from the valve cavity through the opening, and power means for rotating said shaft thereby to rotate the valve ball between open and closed positions.

2. A ball valve structure as set forth in claim 1 wherein said trunnions are of substantially identical proportions and said valve body has opposed openings receiving the trunnions, and means detachably connect the trunnions to the valve body.

3. A ball valve structure as set forth in claim 1 wherein said housing includes a support plate adjacent its outer end and said power means is mounted on said support plate.

4. A ball valve structure as set forth in claim 1 wherein said valve body has an opening through its wall receiving a stop to engage and position the valve ball in the open and closed positions thereof.

5. A ball valve structure comprising a valve body having a chamber therein and upstream and downstream flow passages in communication with the valve chamber, a valve ball mounted within the valve chamber and forming a body cavity between the valve ball and the valve body, trunnions on opposed ends of the valve ball mounting the valve ball for rotation, a gear segment within the body cavity on the outer surface of the valve ball adjacent one of the trunnions in laterally spaced relation thereto, said valve body having an opening therethrough spaced from said adjacent trunnion and extending into said body cavity, a shaft mounted for rotation within said opening and having a gear thereon within the body cavity and in engagement with the gear segment, and power means for rotating said shaft thereby to rotate the valve ball between open and closed positions.

* * * * *